US008170491B2

(12) United States Patent
Shuman et al.

(10) Patent No.: US 8,170,491 B2
(45) Date of Patent: May 1, 2012

(54) SYSTEM AND METHOD FOR REAL-TIME PERFORMANCE AND LOAD STATISTICS OF A COMMUNICATIONS SYSTEM

(75) Inventors: Mohammed Ataur Rahman Shuman, San Diego, CA (US); Daniel Scott Abplanalp, Salem, OR (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 12/435,266

(22) Filed: May 4, 2009

(65) Prior Publication Data

US 2010/0279622 A1 Nov. 4, 2010

(51) Int. Cl.
*H04B 17/00* (2006.01)
*H04W 24/00* (2009.01)

(52) U.S. Cl. .................................. 455/67.11; 455/423

(58) Field of Classification Search ............... 455/67.11, 455/423; 700/108; 706/916, 917; 707/790, 707/795, 812
See application file for complete search history.

(56) References Cited

U.S. PATENT DOCUMENTS

| 7,352,753 | B2 * | 4/2008 | Glad et al. ............... 370/395.53 |
| 7,499,718 | B2 * | 3/2009 | Stephenson et al. .......... 455/513 |
| 2007/0243881 | A1 | 10/2007 | Roskowski |
| 2008/0004035 | A1 | 1/2008 | Atkins et al. |

FOREIGN PATENT DOCUMENTS

WO   WO2007100402    9/2007

OTHER PUBLICATIONS

International Search Report and Written Opinion—PCT/US2010/033595, International Search Authority—European Patent Office—Oct. 19, 2010.

* cited by examiner

*Primary Examiner* — Dean O Takaoka
(74) *Attorney, Agent, or Firm* — Raphael Freiwirth

(57) ABSTRACT

A system and method for producing real-time results of performance data for wireless communications servers are disclosed. A plurality of bins, each bin corresponding to a range, are maintained. When a measurable event is detected, the event is placed into the corresponding bin. When a performance metric is desired, it is calculated based on each bin, and the metric is returned, with an accuracy inversely proportional to the size.

66 Claims, 9 Drawing Sheets

| [0,1] | [1,2] | [2,3] | [3,4] | [4,5] | [5,6] | [6,7] | [7,8] | [8,9] | [9,10] | [10,11] | [11,12] | [12,13] | [13,14] | [14,15] | [15,16] | [16,17] | [17,18] | [18,19] | [19,20] |
|---|---|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 0 | 0 | 0 | 0 |

$t = 15$
$CALC_{min} = 1.5$
$CALC_{max} = 15.5$
$CALC_{avg} = 8.5$
$ERR_{min} = 0.5$
$ERR_{max} = 0.5$
$ERR_{avg} = 0.5$

| [0,1] | [1,2] | [2,3] | [3,4] | [4,5] | [5,6] | [6,7] | [7,8] | [8,9] | [9,10] | [10,11] | [11,12] | [12,13] | [13,14] | [14,15] | [15,16] | [16,17] | [17,18] | [18,19] | [19,20] |
|---|---|---|---|---|---|---|---|---|---|---|---|---|---|---|---|---|---|---|---|
| 0 | 2 | 2 | 2 | 2 | 2 | 2 | 2 | 2 | 2 | 2 | 2 | 2 | 2 | 2 | 2 | 0 | 0 | 0 | 0 |

$t = 30$
$CALC_{min} = 1.5$
$CALC_{max} = 15.5$
$CALC_{avg} = 8.5$
$ERR_{min} = 0.5$
$ERR_{max} = 0.5$
$ERR_{avg} = 0.5$

| [0,1] | [1,2] | [2,3] | [3,4] | [4,5] | [5,6] | [6,7] | [7,8] | [8,9] | [9,10] | [10,11] | [11,12] | [12,13] | [13,14] | [14,15] | [15,16] | [16,17] | [17,18] | [18,19] | [19,20] |
|---|---|---|---|---|---|---|---|---|---|---|---|---|---|---|---|---|---|---|---|
| 0 | 3 | 3 | 3 | 3 | 3 | 3 | 3 | 3 | 3 | 3 | 3 | 3 | 3 | 3 | 3 | 0 | 0 | 0 | 0 |

$t = 45$
$CALC_{min} = 1.5$
$CALC_{max} = 15.5$
$CALC_{avg} = 8.5$
$ERR_{min} = 0.5$
$ERR_{max} = 0.5$
$ERR_{avg} = 0.5$

| [0,1] | [1,2] | [2,3] | [3,4] | [4,5] | [5,6] | [6,7] | [7,8] | [8,9] | [9,10] | [10,11] | [11,12] | [12,13] | [13,14] | [14,15] | [15,16] | [16,17] | [17,18] | [18,19] | [19,20] |
|---|---|---|---|---|---|---|---|---|---|---|---|---|---|---|---|---|---|---|---|
| 0 | 4 | 4 | 4 | 4 | 4 | 4 | 4 | 4 | 4 | 4 | 4 | 4 | 4 | 4 | 4 | 0 | 0 | 0 | 0 |

$t = 60$
$CALC_{min} = 1.5$
$CALC_{max} = 15.5$
$CALC_{avg} = 8.5$
$ERR_{min} = 0.5$
$ERR_{max} = 0.5$
$ERR_{avg} = 0.5$

Fig. 9

SYSTEM AND METHOD FOR REAL-TIME PERFORMANCE AND LOAD STATISTICS OF A COMMUNICATIONS SYSTEM

BACKGROUND OF THE INVENTION

1. Field of the Invention

The present invention relates to measuring the performance of wireless communications systems. More specifically, the present invention relates to systems and methods for calculating real-time performance and load statistics on such communications systems.

2. Description of the Related Art

In wireless telecommunication devices, such as cellular phones, PDAs, mini-laptops, and advanced pagers, the devices typically communicate over long distances by bridging telephone calls through existing cellular telephone networks and passing data packets across the network. These wireless devices often have significant data processing and computing capability and can accordingly send and receive software programs, in addition to voice, across the telephone network.

There exists a wireless telecommunication service that provides a quick one-to-one or one-to-many communication that is generically referred to as "Push to talk over cellular" ("PTT PoC," "push to talk," "PTT") capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions. In some arrangements, the PTT speaker will have the "floor" where no other group member can speak while the speaker is holding the button. Once the speaker releases the PTT button, any other individual member of the group can engage their PTT button and take the floor.

It is useful to measure the performance metrics of a wireless communication system that processes calls between a plurality of wireless communications devices, such as a PTT system. Such a system is generally expected to provide service at a certain quality under a given load. This information can be used to provide information about the system status (load and performance of the system) to the network management interface, which can then be used to verify the expected system behavior. Most of the time, certain performance criteria need to be evaluated to verify the contractual agreement between a telecom operator and vendor. It can also be used to provide feedback to the system's call processing algorithm to ensure the necessary system stability and performance.

For instance, a system requirement may entail that for the $95^{th}$ percentile, the system (such as a QUALCOMM QCHA™ system) will contribute no more than 150 ms to initial PTT latency for intra-regional QCHAT direct calls. Without providing a distribution of the measurement from the system, it is not possible to comprehensively verify this metric from the operational commercial network. It would therefore be useful to allow for such a metric to be calculated. Furthermore, it would be useful to provide this information on demand by using the standard network management interface example Simple Network Management Protocol (SNMP) command.

A significant concern that colors the ability of telecommunications systems to provide real-time performance data is the limitations of the systems themselves. Such a system is frequently under an extremely heavy load and has limited resources, both in computational power and memory. To this end, techniques of monitoring performance data must be efficient in at least these areas. Because a call processing server needs to be very fast and connect calls with very low latency, most techniques for measuring system performance are disfavored because they slow down the call processing server.

The prior art teaches taking performance data, storing it off the server, and later calculating the results. The prior art teaches away from real-time performance measurements because it teaches that this offline post facto technique is suitable for the application, when the technique is very slow. The prior art also teaches that only a very limited amount of data may be stored, such as one second's worth of data, and that the storage cannot scale up past a few minutes' worth of data. This limits the validity of measurements. The prior art also teaches using a rolling sum, which allows for producing an average quickly, but cannot be used to produce a maximum, minimum or $95^{th}$ percentile. There exists a problem because existing systems do not have an efficient mechanism of providing a statistical distribution of the communication system's load and performance measurement in near-real-time.

An example in the prior art is a technique that uses a circular queue of a very small number of the most recent data points received, such as 100. For instance, each of 100 data points is represented by a 32-bit integer. However, if each of those integers was instead used to represent a range of values, and the value of that integer represented the number of data points that fall into that range, each of 100 32-bit integers may represent a bin, with each bin allowing for over 4 billion ($2^{32}$) measurements. A small sacrifice in granularity allows for a significant increase in the number of data points that can be stored.

Present telecommunications systems are able to provide an average, minimum and maximum value of system load and system performance metrics based on a limited number of samples or data collected over a limited period of time. This usually takes the form of a running average, where the system stores a sum total and number of calls, as well as a minimum and maximum value observed. It is a limitation of this technique that the granularity of the original data is lost—that is, while a running average value may be calculated, the individual measurements are lost so that, for instance, a 95th percentile of those measurements cannot be calculated. Furthermore, because the granularity is lost, it is not possible to obtain the actual distribution of the load and performance metrics of the system. Additionally, frequently an average, minimum or maximum may not meet the desired need to verify system performance (such as when the system performance metric is based on that 95th percentile).

Without a finer-grain measurement of the performance, performance metrics may appear to fall within an acceptable range when a sizeable portion of the user base may experience unacceptable performance (a few extremely quickly connected calls brings down the average call connection time while the majority of users are experiencing a slow call connection time). As such, it is necessary to know the distribution of system performance metrics in order to evaluate the true performance of the system.

There is not a system currently that allows one to measure the percentile, such as the $95^{th}$ percentile, of measured data based on either a number of most recent calls, such as 200, or a most recent time slice, such as 30 minutes. 30 minutes of calls during a high use hour on a big system may represent several million calls. Furthermore, to store all those calls takes memory resources away from the call processing part of the system, which reduces system performance. To that end, techniques and systems that would allow for such measurements would be an improvement over the prior art.

SUMMARY OF THE INVENTION

Briefly described, the present invention includes systems and methods for calculating real-time performance and load statistics on such a communications system.

The method collects meta-data relating to calls, such as the time that it took to establish a call. It then locates the appropriate bin for the call, among a series of bins that represent different values of the meta-data. Where the meta-data represents an amount of time, each bin represents a range of time, such as 0-99 ms, and 100-199 ms. Once the bin is located, it is incremented. When a performance metric is requested, the method traverses the required number of bins to calculate the result, then calculates and returns the result. For instance, if the performance metric is the longest time it took to establish a call, the method searches for the bin with the largest range that has been incremented and returns that range. If there are bins representing 0-99 ms, 100-199 ms, 200-299 ms, and 300-399 ms and calls have been observed that took 50 ms, 290 ms, and 75 ms to establish, the method would return 200-299 ms in response to the request.

The system may be used to calculate real-time evaluation of the system load and performance statistics in a distribution that can be used to monitor the system status, calculate a trend analysis, keep track of whether a threshold alarm has been tripped, and offer feedback to the system's algorithm, such as one for overload control.

This technique allows for extremely quick determination of performance data, producing near-real-time results. The present techniques have been observed to require no more than 150 ms latency, whereas prior art is known to generate performance data approximately every 30 minutes. This is a significant improvement because it allows one to monitor the present condition of the system rather than a former condition of the system that may no longer exist.

The present techniques also allow the system to determine comprehensive performance metric distributions based on a greater data sample while saving time and money. Furthermore, the present techniques allow the system to present a true reflection of the system performance and load by logging each successful call or transaction made across an entire user population.

Further, the present techniques offer a much more cost effective means to generate and report more comprehensive system performance data. Since the server, such as a PTT server or network management system, has access to the histogram, it can process the data later to calculate consolidated metrics or generate cumulative data distributions as they are needed.

It is not necessary to store every data point from the system to create a histogram. To do so would require much more memory and disk space than is commonly available on a wireless communications system for such metric measurements. Instead, by approximating the distribution to a required accuracy by controlling the size of a bin and keeping only a total count of entries that fall into each bin, one may significantly limit the memory and disk resources necessary to support a histogram.

The worst case scenario for the present techniques is that each data point is placed in a different bin. That worst case scenario is the best case scenario for the prior art, since the memory size of a bin used here corresponds to the memory size of a single data point in the prior art. Where a plurality of data points are placed in a single bin, the present techniques offer great improvement in resource utilization.

Instead of giving an absolute $95^{th}$ percentile value, which would require storing every data point, the present technique allows for estimating the 95 percentile value to any arbitrary precision by varying the bin size (and the corresponding amount of system resources used to store the bins). It is significantly faster to generate a report based on 100 bins, which sum to one million, as opposed to the one million data points themselves, as prior art techniques would require.

Other objects, features, and advantages of the present invention will become apparent after review of the Brief Description of the Drawings, Detailed Description of the Invention, and the Claims.

BRIEF DESCRIPTION OF THE DRAWINGS

FIG. 9 is a representation of the use of data buckets to hold increasing data points over time.

DETAILED DESCRIPTION OF THE INVENTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" include plural references, unless otherwise specified in the description.

Figure 1:
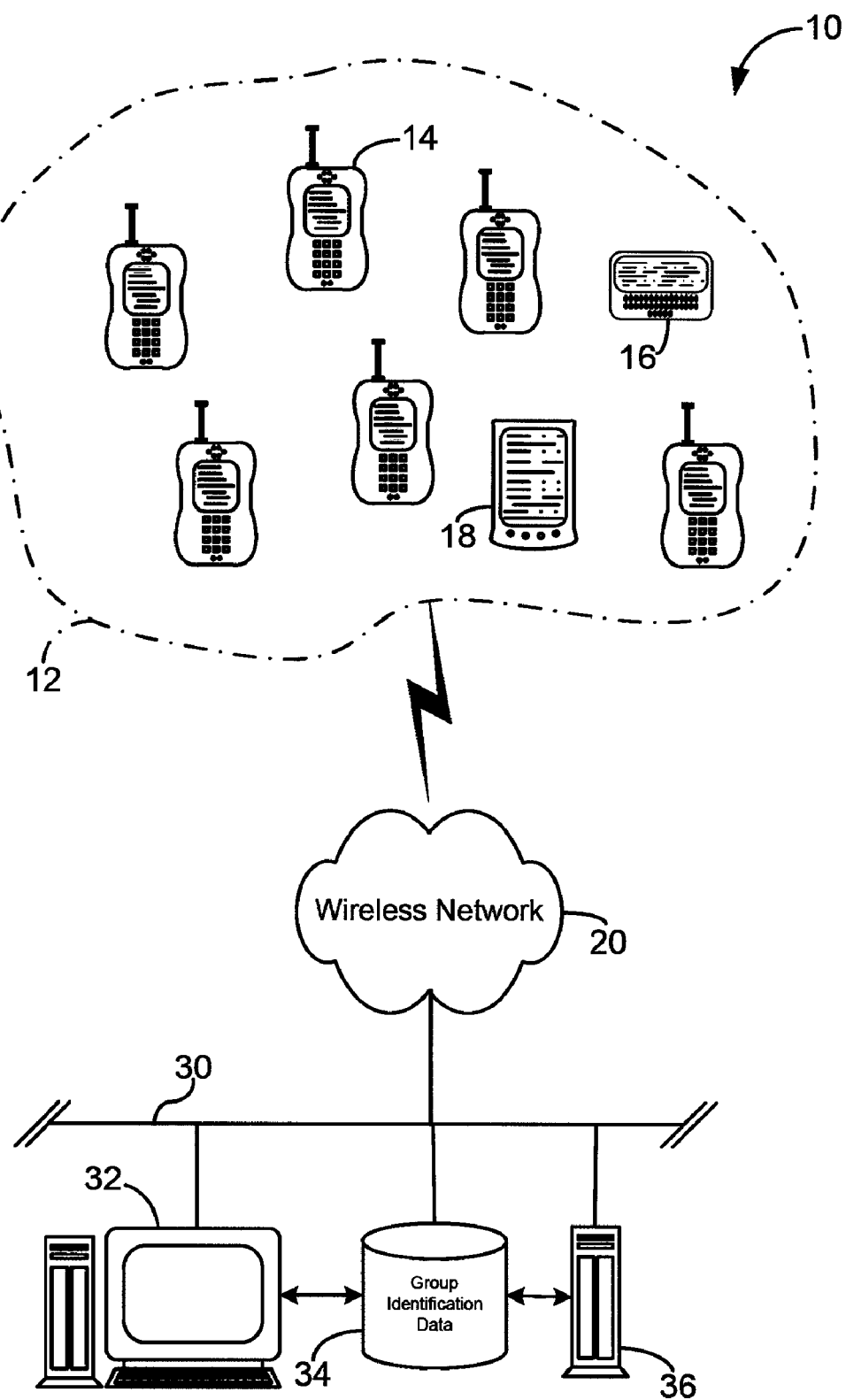
FIG. 1 is a representative diagram of a wireless network with a designated PTT group of wireless telecommunication devices communicating with a group communication server and other computer devices across the wireless network.

With reference to the figures, FIG. 1 illustrates one embodiment of the system 10 for sharing group media among one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) sends a flag to at least the group communication computer device, shown here as server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share with other computer devices resident on the server-side LAN 30 or accessible across the wireless network 20. The group communication computer device 32 can have an attached or accessible database 34 to store the group identification data for the wireless devices. A data store 36, shown here as file management server, is also present on the server-side LAN 30. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14,16,18 and the one or more other wireless telecommunication devices of the target set. Also, the group communication computer device 32 can attempt to bridge the requested direct communication with the target set if at least one of the wireless telecommunication devices of the target set has informed the group communication computer device 32 of its presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of its presence on the wireless network 20. Further, while the group communication computer device 32 is shown here as having the attached database 34 of group identification data, the group communication computer device 32 can have group identity data resident thereupon, and perform all storage functions described herein.

In overview, the system 10 includes at least one wireless communication device, such as mobile telephone 14, that is a member of a communication group 12 of wireless communication devices that communicate with each other in direct group communications across a wireless communication network 20, the at least one wireless communication device configured to selectively send group-directed media to other members of the communication group 12. At least one group communication computer device 32 is configured to store information on communication groups 12 on the wireless communication network 20, the information including the identity of the specific member wireless communication devices of one or more communication groups. The group communication computer device 32 is further configured to selectively receive group-directed media from a sending wireless communication device, such as mobile telephone 14, of a communication group 12 and send the group-directed media to the other member wireless communication devices of the communication group 12 for the sending wireless communication device.

The system 10 can further include a data store 36 in communication with the group communication computer device (s) 32, with the group communication computer device 32 configured to send group-directed media to the data store 36, as is further described herein. The data store 36 may be configured to receive the group-designated media from the wireless communication device (such as mobile phone 14) and selectively permit members of the communication group 12 for which the group-directed media was sent to access the stored group-directed media across the wireless communication network 20.

The group-directed media can be graphic media, such as pictures in JPEG, TIF, and the like, or audio files such as MP3, MP4, WAV, and the like. The media can also be streaming media, such as a multimedia application (POWER POINT™, MOV file, and the like). The group-directed media can also be an interactive session on another computer device on the wireless communication network 20, such as a game hosted on data store 36 or private bulletin board. For example, participants in a game can chat via the group-communication about the ongoing game. Also, the group-directed media could be half-duplex video conferencing among members of the communication group wherein the picture of the speaker is broadcast to the other group members in substantial real-time, or in delay.

The size of these media files can be very large, and because of the potential delay of sending the media, or inability of the receiving wireless communication device to handle the sent media, the system 10 can use a data store 36 (or file management server or other computer device) to store the group-directed media such that target members of the communication group 12 can selectively access the stored media without interrupting other PTT communications. The data store 36 can be configured to automatically send the group-directed media to each of the member wireless devices of the communication group 12 upon establishing a communication link therewith. Alternatively, in one embodiment, if the group-directed media is stored at the data store 36, the group communication computer device 32 or the data store 36 can send a hyperlink to the other member wireless communication devices of the communication group 12 that provides a link to the stored group-directed media at the data store 36. Upon receipt of the group-directed media by at least one of the member wireless devices of the communication group, the group communication computer device 32 can send to the wireless communication device 14,16,18 sending the group-directed media an acknowledgement that at least one member wireless communication device of the communication group 12 received the group-directed media.

The wireless communication device 14,16,18 can send communication group identification data to the group communication computer device 32 at the time of requesting the group-directed media to be sent, e.g. send a target list, and thus, the group communication device 32 will send or store the group-directed media to the member wireless communication devices identified in the communication group identification data based upon a variety of criteria as is further discussed herein. Alternately, prior to the wireless communication device sending group-directed media, the wireless communication device 14,16,18 can request member data for a communication group 12 from the group communication computer device 32, and the group communication computer device 32 can send one or more addresses or communication group addresses to the wireless communication device 14,16, 18. In one embodiment, the communication group computer device 32 can filter the potential communication groups available based upon their member devices' capability to received group-directed media.

As is further described herein, the wireless communication device 14,16,18 can be engaged in a group communication with the member wireless communication devices of the communication group 12, and send group-directed media during the group communication in the same communication session, or independently therefrom. Alternately, the group-directed media can be sent independently of the group-communication session.

Figure 2:
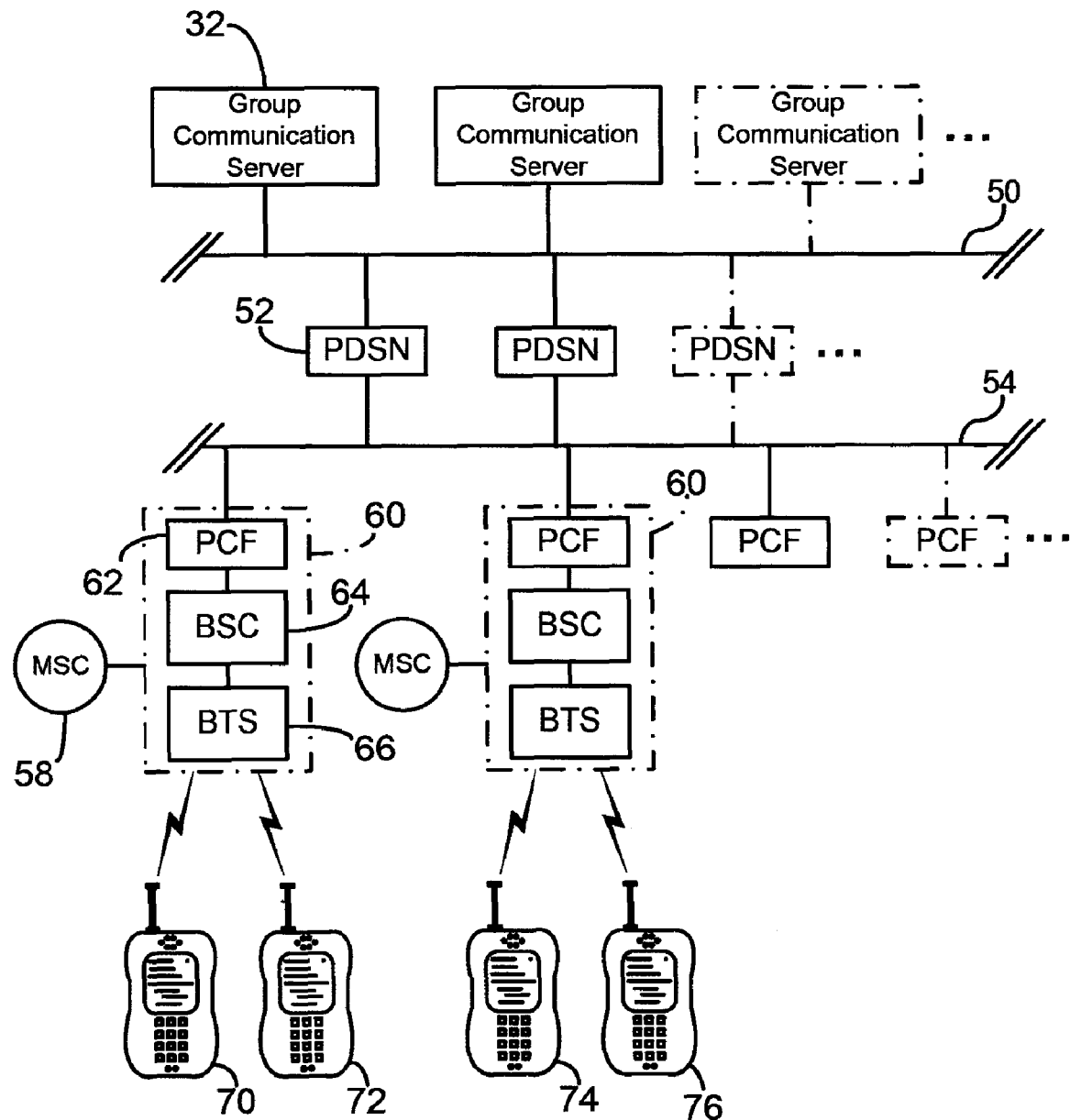
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration having a series of group communication computer devices (group communication servers) 32 that control communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service providers packet data service node (PDSN) such as PSDN 52, shown here resident on a carrier network 54. Each PSDN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Figure 3:
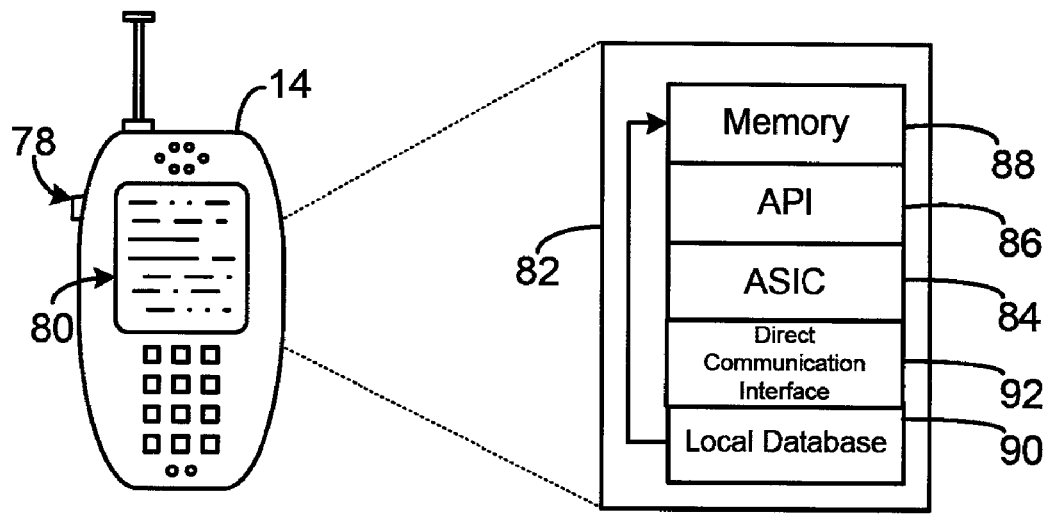
FIG. 3 is a block diagram illustrating the computer platform of the wireless telecommunication device with PTT capability.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct communications will occur through, or at the control of, the group communication computer device 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a direct communication interface 92 that can open the direct communication channel from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
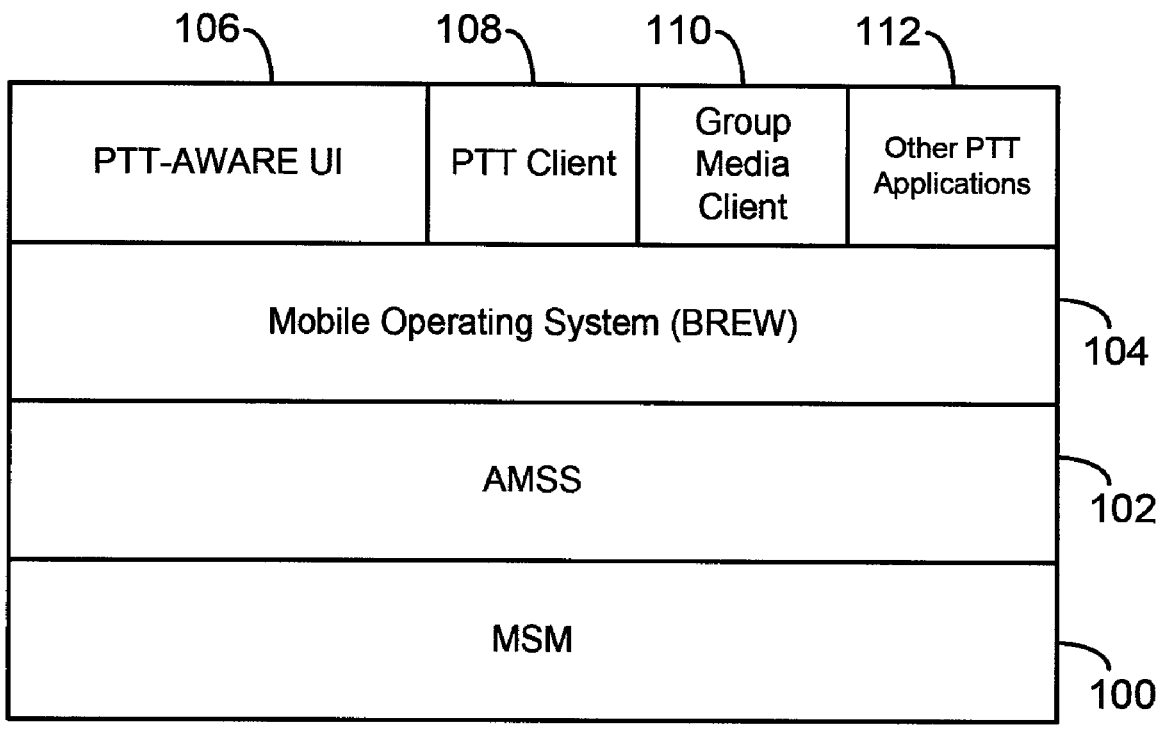
FIG. 4 is a diagram of one embodiment of the software layers of the communication group application, with a PTT client and a group-directed media client.

FIG. 4 is a diagram of one embodiment of the software layers of the group application client with a PTT facility and a group-directed media facility. In this embodiment, the computer platform 82 in the mobile device environment consists of a series of software "layers" developed on top of the Mobile Station Modem (MSM) 100 and the Advanced Mobile Subscriber Software (AMSS) 102, developed by QUAL-COMM, drives the underlying MSM chipset and implements the software protocol stack for the entire suite of CDMA communication technologies that include CDMA2000 1X and CDMA2000 1xEV-DO. There is a mobile operating system layer 104, which in this embodiment is BREW®, also developed by QUALCOMM. The mobile operating system layer 104 application programming interfaces for chip- or device-specific operations, while providing an isolation layer that eliminates direct contact to the AMSS 100 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown as a PTT-aware UI 106. The PTT Client includes all the functions required to enable mobile operating system 104 applications, such as the Group Media Client 110. In addition to providing access to PTT services with the PTT Client 108, the PTT Client 108 preferably acts as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

The Group Media Client 110 is a mobile operating system-based application that extends PTT services for access to media types other than the traditional half duplex voice communications (VoIP-PTT media). The Group Media Client 110 provides access to group-media services through an external interface, in one embodiment being a separate API, such as a Group Media Aware API. The Group Media Aware UI is an application that may be developed entirely as a mobile operating system-based application or used in combination with an AMSS 102 interface. The Group Media Aware UI responds to user requests for group-directed media services by invoking the appropriate APIs, such as those from other resident PTT and group media applications 112. The Group Media Client 110 services the requests from the user and informs the user of the result of any group-directed media request. The user can also configure settings on the Group Media Client 110 that specify how to handle an incoming notification that indicates there is a file to be downloaded from the file management server (data store 36). For example, the Group Media Client 110 can elect to have the file download commence immediately or to allow the target user to be prompted to determine whether to download the file.

Figure 5:
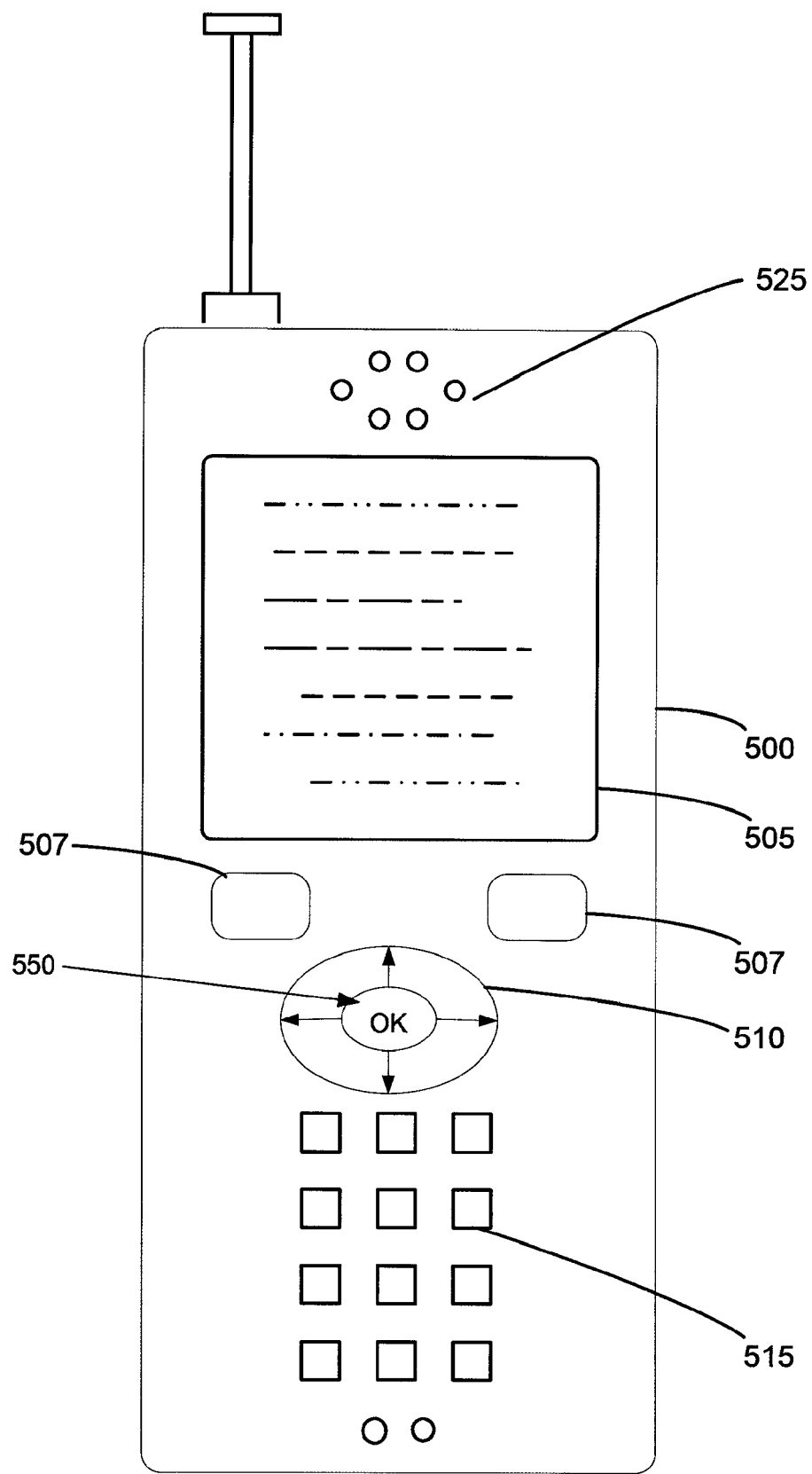
FIG. 5 is an exemplary mobile communications device.

Referring to FIG. 5, illustrated is an exemplary mobile communication device 500, and in particular, the user interface for the device. The device typically includes a display 505 that may comprise an LCD or OLED display. In some embodiments, the display may include touch screen capability. The device may include a keypad 515 that may be a standard phone keypad, or in other embodiments a QWERTY keypad. The device may also include navigation buttons 510 that may further comprise up, down, left, and right keys for navigating through the display 505. The navigation keys may further comprise a selection or OK key 550 to indicate the user's selection or acknowledgment of a particular function. The device may also include soft keys 507 that are programmable and used to select the function as indicated in an area of display 505 near the soft key.

Figure 8:
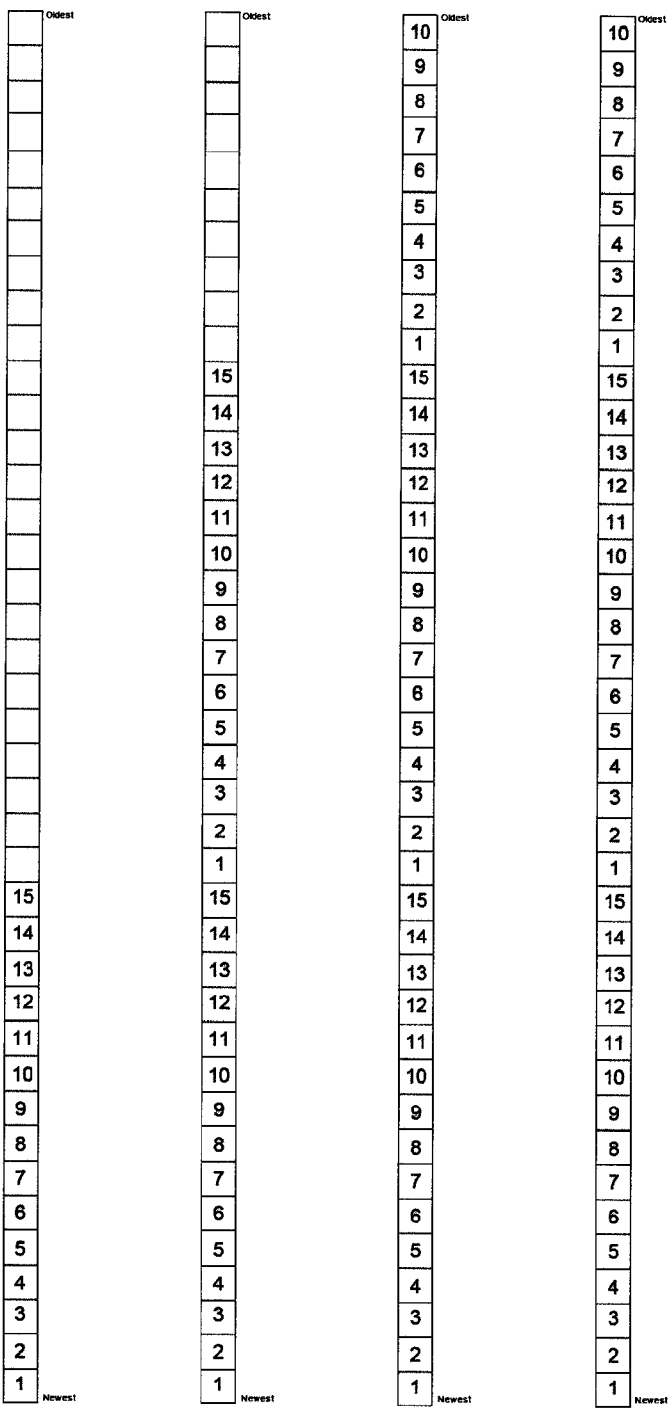
FIG. 8 is a representation of data being added to an array over time.

Referring to FIG. 5, in one embodiment the device may illuminate one or more buttons from keypad 515, navigation buttons 510, or OK key 550. The button(s) may illuminate steady in a particular color, or may flash on/off, or in any other manner as configured in the device or by the user. Additionally and optionally, the device may provide an indication of recording or other function on display 505. The mobile communications device may further provide an aural indication such as a periodic tone, or provide other indications that may be configured by the user on the device. The present system accordingly optimizes the collection of meta-data relating to calls, such as the time that it took to establish a call, through several methods. In a first approach, the system collects the specified data into a data structure of perfect size. This data structure is assumed to (a) be sized exactly to the number of data points, and (b) assume there is no storage overhead to the data structure. One such data structure that fits these requirements would be an array of the given number of elements. Thus, counters are stored in a "dense" data structure that requires no storage overhead. For example, an array of 32-bit unsigned integers is one such data structure, such as shown in FIG. 8, that could contain up to $2^{32}$ values.

In a second approach, the system collects the specified data into data "buckets" and the "bucket" data structure is assumed to consist of a collection of counters, where each counter is sized such that the total number of elements can be represented by any of the bucket counts. Dynamic resizing of the buckets is possible (while at some performance cost). In the second approach, the counters are stored in a "sparse" data structure, such as that shown in FIG. 10, that need not store records for empty buckets, but would incur some storage overhead for each counter stored. A binary tree of 32-bit unsigned integers would be an example of one such data structure that could contain up to $2^{32}$ values. For each counter stored, this binary tree would have the additional overhead of the node value, as well as two additional pointer values.

Figure 6:
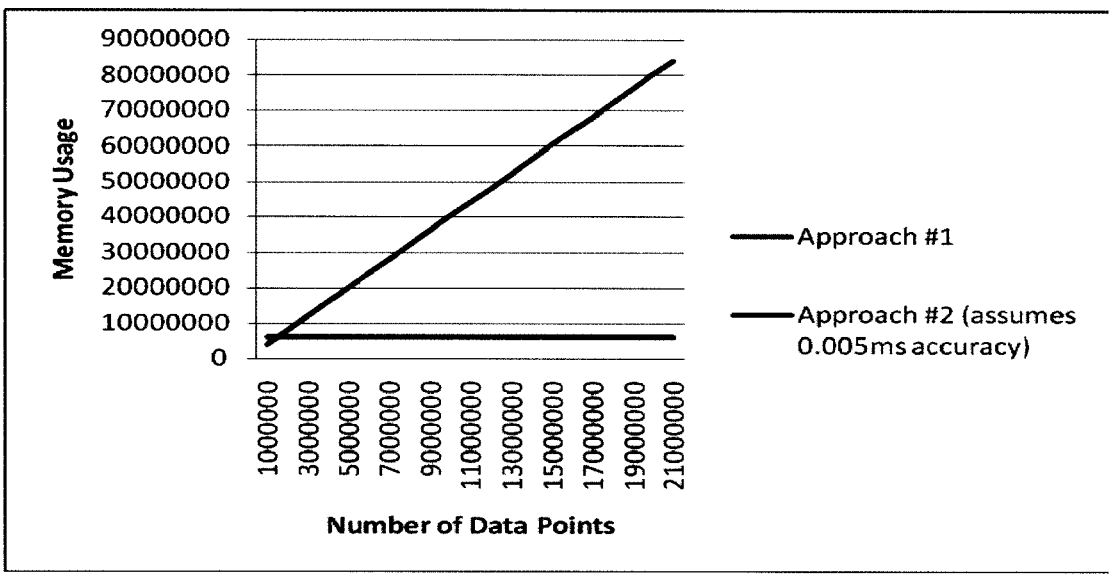
FIG. 6 is a graph illustrating memory usage as data points increase.

FIG. 6 is a graph illustrating the memory usage as data points increase for the first and second approaches. For purposes of size comparison, in the first approach, storing n values will require n*size of(value) bytes of memory.

$$SIZE(n) = n \times sizeof(value)$$

In this configuration, storing 10 million 32-bit values will require 40 million bytes of memory.

In the second approach, in a dense storage format, storing n values will require ((range size)/(bucket granularity))*size of(counter) bytes of memory.

$$SIZE(n) = NUMBUCKETS(n) \times sizeof(counter)$$

$$NUMBUCKETS(n) = \frac{total\_range}{bucket\_granularity}$$

In this configuration, storing up to $2^{32}$ 32-bit values (using an unsigned counter of 32-bits) will depend upon the range and bucket granularity desired. For example, assuming a range of 0 to 15 seconds and a bucket granularity of 1 millisecond, this will require 60 thousand bytes of memory.

In the second approach, in a sparse data storage format, storing n values will depend upon the distribution of values. These calculations utilize a repetition factor r (r=0 implies all values fall into unique buckets up to the maximum number of buckets, r=1 implies all values fall into a single bucket), and a fixed overhead factor o that is specific to the underlying datatype (o=1 implies zero additional overhead, o=1.5 implies 50% overhead, so it would require 150 bytes to store 100 bytes of usable data). The memory required to store n values will be:

$$SIZE(n) = NUMBUCKETS(n) \times sizeof(\text{counter}) \times o$$

$$NUMBUCKETS(n) = \text{MIN}\left(\text{MAX}(1, n \times (1-r)), \frac{\text{total\_range}}{\text{bucket\_granularity}}\right)$$

If r=0 (the worst case scenario) and the total number of data points stored is larger than the total number of buckets (and both are greater than 1), this is the "dense" size formula multiplied by the overhead factor. If r=1 (the absolute best case scenario), the space required will be the size of a single counter multiplied by the overhead factor.

In this configuration, storing up to 2^32 32-bit values (using an unsigned counter of 32-bits) will depend upon the desired range and bucket granularity, as well as the amount of repetition within the data set and overhead of the underlying data structure. Assuming a range of 0 to 15 seconds, a bucket granularity of 1 millisecond, a repetition factor of zero and an overhead factor of 4, this will require 240 thousand bytes of memory. Assuming a repetition factor of 0.75, this will require 60 thousand bytes of memory.

Figure 7:
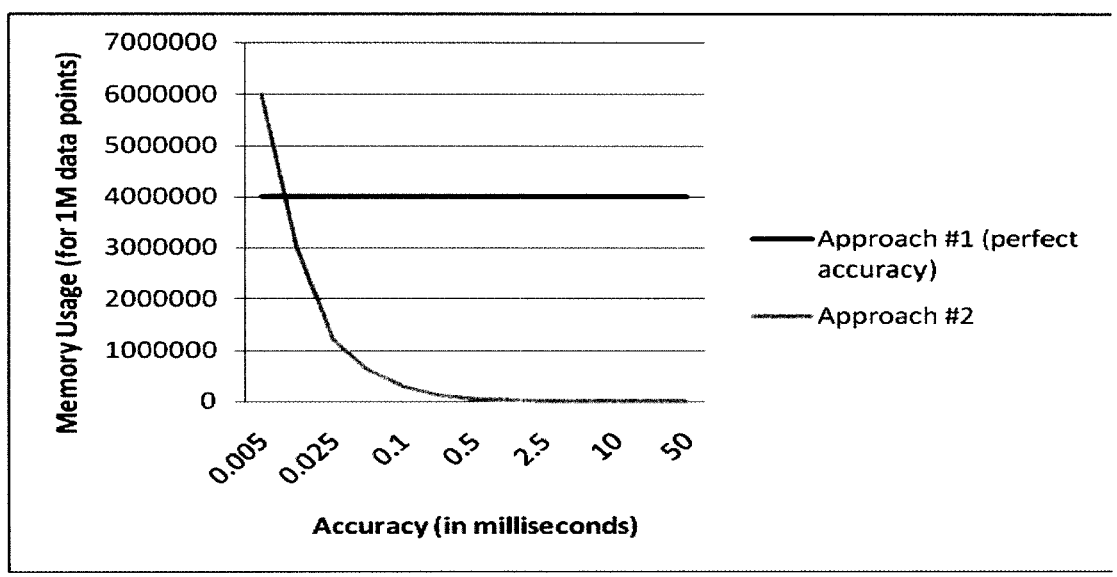
FIG. 7 is a graph illustrating memory usage as accuracy decreases.

FIG. 7 is a graph illustrating memory usage as accuracy decreases utilizing the first and second approaches. Relative to the improvement of accuracy in the first approach, calculating the 95$^{th}$ percentile value over the data set will result in a value that is accurate (to the limit of the input). The minimum value and maximum value can be uniquely identified.

In the second approach, in both dense and sparse configurations, because each data point loses accuracy when converted from an absolute value into a bucket value, the 95$^{th}$ percentile value can only be estimated from the data that is actually stored. Each bucket will have an absolute count of the number of values that fall within that bucket, so the bucket containing the 95$^{th}$ percentile can be correctly identified. If one reports the mid-point of the selected bucket for the 95$^{th}$ percentile value, the actual value must fall within plus or minus 50% of the bucket granularity. Minimum and maximum buckets can also be identified and these will also lead to an accuracy of plus or minus 50% of the bucket granularity.

It should be noted that in the second approach, if there are values that fall below the minimum bucket, the minimum value estimate will not meet this accuracy range. Similarly, if the 95$^{th}$ percentile value falls in the minimum bucket and at least one value has fallen in the minimum bucket, the 95$^{th}$ percentile value will not meet this accuracy range. The same logic applies to the maximum value and 95$^{th}$ percentile if at least one value falls above the maximum bucket value. The insertion can be monitored to track when an accuracy guarantee can be made and when it cannot.

In the exemplary array shown in FIG. 8, assume that there is an infinite data set, where the values 15 through 1 are repeated cyclically. The first 35 data values of this set would be 15, 14, 13, 12, 11, 10, 9, 8, 7, 6, 5, 4, 3, 2, 1, 15, 14, 13, 12, 11, 10, 9, 8, 7, 6, 5, 4, 3, 2, 1, 15, 14, 13, 12, and 11. In the first approach, because this is an infinite data set, one will be unable to create a data structure of sufficient size to hold all of the data. So assuming an upper limit of data to store, and when that size is reached, one drops the oldest data, replacing it with the newest data. This will be equivalent to a circular queue. In this case, a queue of size 40, as represented in FIG. 8. Data points are added to the bottom of each queue, shifting the existing values "up." When an element is shifted off of the "top" of the queue, the data point is discarded.

After 15 elements have been recorded, no data points have been lost; one can calculate the absolute minimum, maximum and average values, and they will match the theoretical values. After 30 elements have been recorded, one still has not lost any data points; the calculated values still match the theoretical values. Once 40 values are reached, the queue used to store the data is at capacity. Any additional data points will cause prior data points to be discarded. At that point, the calculated min, max and average values will start to diverge from the theoretical values. In our case, after 45 elements have been added, the distribution of the data is such that the min and max values happen to agree with the theoretical values. The average value has started to diverge, in this case being off by ⅝$^{th}$ of a unit.

As elements continue to be added (and older elements discarded) from this array, our calculated min, max and average will continue to diverge from the theoretical values. Due to the nature of the input, there is a limit in the maximum amount of error that one can encounter in this case, but a more general case will become less accurate over time. After 60 data points have been added, the min, max and average calculations are performed over the most recent 40 data points. 33% of the total data points are not considered in the calculations. The ratio of data considered to data discarded gets worse the more data points added in excess of the maximum capacity.

In the second approach in FIG. 9 the use of data buckets to hold increasing data points over time with dense storage is shown. One can use the understanding of the data set attempted to be captured to establish guidelines on the number of buckets and bucket size needed to estimate the min, max and average values to the necessary accuracy. In this case, assume that our data is constrained between 0 and 20, and that the calculations must be accurate within 0.5 units. This means that we will have a bucket size of 1 (equal to twice the necessary accuracy), and 20 total buckets. The first bucket will be incremented for all data points x where 0<=x<1. The second bucket will be incremented if 1<=x<2. This continues up to the 20$^{th}$ bucket, which will be incremented for 19<=x<20. Notice that the values chosen happen to require half the memory as the first approach.

After data points have been recorded, we can estimate the min, max and average. Because each bucket is a range, we cannot use absolute values for each bucket; instead, each bucket will contribute based on its counter and the midpoint of the range. This allows one to estimate these values and the maximum error will be the size of one bucket. Even after 30, 45 or 60 data points have been added, one can still include all data points towards the calculations. It should be noted that in this example, the true data points fall as far as possible from the midpoints of the buckets. This means that with this bucket size and data set one is at maximum error. Even so, the average value after 60 data points is more accurate than the average value calculated using the first approach. Furthermore, one is using half of the memory to store the data than the first approach.

Figure 10:
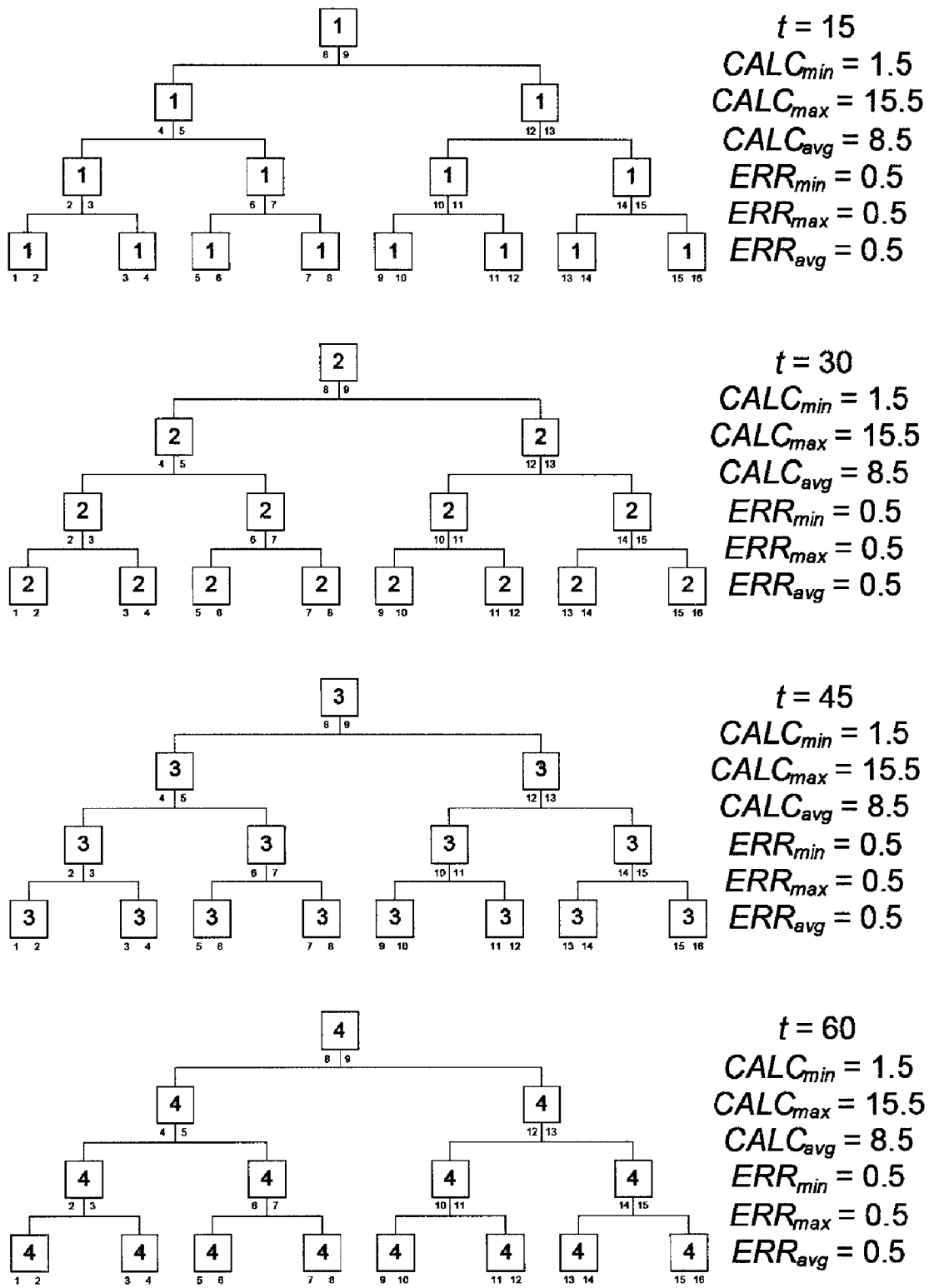
FIG. 10 is a representation of the use of data buckets arranged in a sparse data tree to hold increasing data points over time.
Figure 11:
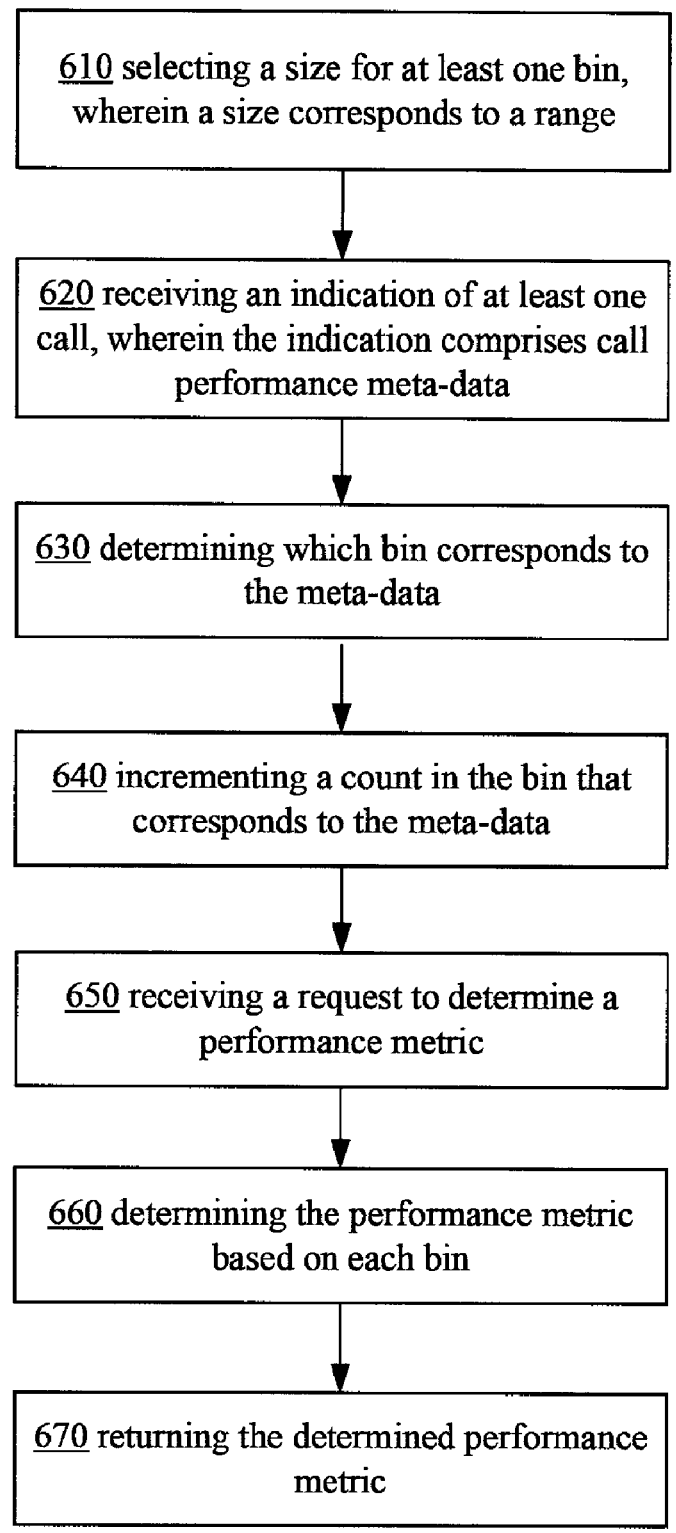
FIG. 11 depicts an exemplary process incorporating some of the embodiments disclosed herein.

FIG. 10 is a representation of the use of data buckets arranged in a sparse data tree to hold increasing data points over time utilizing the second approach. Using the same understanding of the expected data that allowed the sizing of the dense second approach, one can similarly size the sparse data structure. The data is required to be accurate to within 0.5 units (leading to a bucket size of 1), and the data is expected to fall between 0 and 20. However, using a sparse data structure like a tree (illustrated in FIG. 10) can save further memory.

In this case, even though it is expected that the range falls within 0 to 20, the actual data did not require the entire range. Rather than needing 20 buckets to represent the data, one can use 15. If there are expected gaps in the distribution of the data, a sparse data structure like this can save additional memory even though it requires more memory to handle the "bookkeeping."

FIG. 6 depicts an exemplary process incorporating some of the embodiments of calculating real-time performance and load statistics on such a communications system.

In an embodiment, the process begins with selecting a size for at least one bin, wherein a size corresponds to a range 610. For instance, where a unit of time is being measured, a bin size may be a period of time, such as 100 ms, and then bins with that size may have ranges of 0-99 ms, 100-199 ms. In an embodiment, each range comprise a minimum value and a maximum value. For instance, a bin with a range of 100-199 ms would have a minimum value of 100 ms and a maximum value of 199 ms.

In an embodiment, the bin with the smallest minimum value comprises a larger size than at least one other bin. For instance, in a case where most data points fall between 300 and 349 ms, and almost no data points fall below 300 ms, it would be disadvantageous to use memory resources to have small bin ranges for bins below 300 ms. In this case, an arrangement of bin ranges that best utilizes available memory resources may be 0-299 msec, 300-304 ms, 305-309 ms, . . . , and 345-349 ms. That allows for a fine grain differentiation within that range of interest—300-349 ms, without the need for a lot of bins at other points In an embodiment, the bin with the largest maximum value comprises a larger size than at least one other bin. Carrying on with the above example, there may be a bin that has a range of 350 msec—infinity. That's an extremely large range, but it may be an appropriate bin size where no meta-data is expected to fall within that range, or where no meta-data that does fall within that range would be used to calculate a given performance metric of interest.

The two embodiments above are example embodiments where at least one bin has a different size than the size of at least one other bin. Bins with different sizes may be used to capture an important range of data with fine granularity. The downside is that, when the bins with larger sizes are used to calculate a performance metric, the granularity is proportionally increased. For instance, where an average among bins that all have a size of 5 ms is requested as the performance metric, then the accuracy may be given within 5 ms. However, when a single bin of size 10 ms is included in determining the performance metric, then the accuracy rises to within 10 ms, even though all bins but one have a much smaller size.

In an embodiment, as meta-data is collected the bin sizes may need to be adjusted. For instance, where the bins collectively span a range of 0-199 ms, there are no memory resources available to allocate to an additional bin, and if a meta-data of 220 ms is received, bins may need to be combined to free up new bins to cover this new necessary range. In an embodiment, doing this comprises modifying the range of a first bin by replacing the first bin's maximum size with a second bin's maximum size, wherein the second bin's maximum value is greater than the first bin's maximum value, and no values exist between the first bin's maximum value and the second bin's minimum value; and incrementing the count of the first bin by the count of the second bin. For instance a bin with a range of 100-109 ms and a count of 12, and a bin with a range of 110-119 ms and a count of 17 may be combined by changing the maximum size of the first bin to 119, so that it now ranges from 100-119 and changing its count to 29, the sum of its original count of 12 and the second bin's count of 17. Now the second bin may be allocated to a new range to capture the new meta-data that had previously fallen outside of the collective range of the bins.

In an embodiment, doing this comprises decrementing the second bin's count to zero; modifying the second bin's range such that the difference between the second bin's maximum value and the second bin's minimum value equals the size, such that the range of the second bin does not overlap with the range of any other bin, and such that the meta-data is greater than or equal to the second bin's modified minimum value and less than or equal to the second bin's modified maximum value; and incrementing the second bin's count.

Continuing with the above example, the second bin's count would be decremented from 17 to 0. Then the size and range of the second bin would be set such that they encompass the new meta-data. For instance, the second bin may be set to have a size of 100 ms and a range of 200-299 ms, which encompasses the meta-data of 220 ms. Furthermore, since pre-existing bins span from 0-199 ms collectively, this new range of 200-299 ms does not overlap with any preexisting bin.

In an embodiment, no bin's range overlaps with any other bin's range. For instance, the bins may have ranges of 0-9 ms, 10-19 ms, 20-29 ms, . . . 90-99 ms. Were there two bins that overlapped, say one with range 0-9 ms and one with range 5-14 ms, and meta-data of 7 ms is received, it is unclear which bin it should be place d into. It would furthermore be a waste of space resources because two bins would be redundantly appropriate for all values between 5 and 9 ms.

In an embodiment, the bins comprise a fixed data structure, such as a vector or an array. An array typically comprises a group of elements where one element is the base element and the remainder are referenced relative to the base element. They are typically stored in a contiguous area of storage. A vector is typically a one-dimensional array. In an embodiment, the bins are stored such that each bin comprises an element in the array, as well as stored in range order, such that the bin with the smallest minimum value is the base element of the array, and the bin with the largest maximum value is the last bin in an element of the array.

In an embodiment, the bins comprise a dynamic data structure, such as a hash table, a tree, or a map. Typically, a hash table uses a hash function to transform a key (such as the received meta-data) into a hash, which is used as an index in an array to locate the desired location where the value should go. Typically, a tree comprises a set of linked nodes, where the nodes represent progressively finer differentiation of ranges as the tree is traversed from the root to the leaf nodes, with leaf nodes serving as bins in an embodiment. Typically, a map, or associative array, comprises a collection of unique keys and values (her, bins), wherein each key is associated with one value. An operation then is performed on a key to determine the correct value.

In an embodiment, the next step of the process comprises receiving an indication of at least one call, wherein the indication comprises call performance meta-data 620. That indication may be the call itself, and the system, in the course of processing the call may monitor the status of the call to produce an indication comprising the call. The meta-data may be a metric for a wide variety of call metrics, such as a percentile value, average load, minimum load, maximum load, busy hour call attempt, Erlang, latency, call setup latency, processing time, standard deviation, and call success rate.

A percentile value may refer to the number of calls that have the meta-data that falls within the given percentile value. For instance, where there are four calls received, with respective setup latency of 5 ms, 7 ms, 10 ms, and 15 ms, and the percentile value of setup latency requested is 75%, the $75^{th}$ percentile would refer to the 10 ms data point, and the bin in which the 10 ms data point is located. If the bins comprise 0-9 ms, 10-20 ms, and 20-30 ms, the 10-20 ms bin would be the one referred to under the present circumstances.

The average load may refer to the mean amount of system load observed during the recording period. The minimum load may refer to the minimum amount of system load observed during the recording period. The maximum load may refer to the maximum amount of system load observed during the recording period. The busy hour typically refers to the 60-minute period of time in a 24-hour period where the most traffic load occurs. The busy hour call attempt then refers to the number of calls attempted during that 60-minute period.

Erlang is used to refer to a statistical measure of the volume of telecommunications traffic. One Erlang refers to one single resource being in continuous use (collectively, so two resources each at 50% use would also sum to one Erlang). Latency may refer to a variety of different types of latency within a telecommunications system, including audio latency—the time between when one user speaks into his mobile device and when a second user hears the first user in his mobile device. Call setup latency may refer to the time between when a user attempts to initialize a call and when that user is connected with his desired recipient to conduct a call. Processing time may refer to the time required by the telecommunications server handling the call to process a call request or perform other functions relating to a call.

In an embodiment, the next step of the process comprises determining which bin corresponds to the meta-data 630. In an embodiment, where the bins collectively range over all values from zero to the maximum value of any bin, and each bin size is the same value, when a data point is collected, the appropriate bin is determined by dividing the value of the data point by the bin size. The bin is then located and incremented by one. In a dynamic data structure such as a sparse map, if a given bin is not yet incremented, such as the one representing 400-499 msec, then that bin does not exist, saving more space. In such an embodiment, the method further comprises allocating storage resources for the bin that corresponds to the meta-data when incrementing the count in the bin the first time.

The average can be calculated, by taking the total value of each bin as the value of a bin multiplied by the number of data points stored that bin, summing the total value of all bins, and then dividing by the total number of data points. The minimum and maximum values are determined by locating the bin with the smallest or largest bin that contains a non-zero count, respectively. The $95^{th}$ percentile value can be determined by traversing the bins in increasing value until 95% of the entries (by count) have been traversed and returning the range of the present bin.

In an embodiment, the next step of the process comprises incrementing a count in the bin that corresponds to the meta-data 640. In an embodiment, all bins are set to a count of 0 when the method is initiated, and the bins comprise an integer to represent the count. Then when the bin that corresponds to the meta-data is determined, the count of that bin is incremented by one. Under such a technique, where a bin has a count of 42, that means that 42 calls with meta-data that correspond to that bin have been observed since monitoring began.

In an embodiment, the next step of the process comprises receiving a request to determine a performance metric 650. In an embodiment, the method executes on the communications system that's performance is being measured. A user at a local terminal may then enter a request to determine a performance metric in the system that is passed to the method. In another embodiment, the system is accessible remotely, and the request is sent by a user across a communications network. In an embodiment, periodic reports are generated, and the request is generated by a system charged with sending a request every specified time period.

In an embodiment, the performance metric is at least one from a set, the set comprising system load and system performance. In an embodiment, system load is at least one from a subset, the subset comprising a percentile value, average load, minimum load, maximum load, busy hour call attempt, and Erlang. In an embodiment, the system performance is at least one from a subset, the subset comprising latency, call setup latency, and processing time.

A percentile value may refer to the number of calls that have the meta-data that falls within the given percentile value. For instance, where there are four calls received, with respective setup latency of 5 ms, 7 ms, 10 ms, and 15 ms, and the percentile value of setup latency requested is 75%, the $75^{th}$ percentile would refer to the 10 ms data point, and the bin in which the 10 ms data point is located. If the bins comprise 0-9 ms, 10-20 ms, and 20-30 ms, the 10-20 ms bin would be the one referred to under the present circumstances.

The average load may refer to the mean amount of system load observed during the recording period. The minimum load may refer to the minimum amount of system load observed during the recording period. The maximum load may refer to the maximum amount of system load observed during the recording period. The busy hour typically refers to the 60-minute period of time in a 24-hour period where the most traffic load occurs. The busy hour call attempt then refers to the number of calls attempted during that 60-minute period.

Erlang is used to refer to a statistical measure of the volume of telecommunications traffic. One Erlang refers to one single resource being in continuous use (collectively, so two resources each at 50% use would also sum to one Erlang). Latency may refer to a variety of different types of latency within a telecommunications system, including audio latency—the time between when one user speaks into his mobile device and when a second user hears the first user in his mobile device. Call setup latency may refer to the time between when a user attempts to initialize a call and when that user is connected with his desired recipient to conduct a call. Processing time may refer to the time required by the telecommunications server handling the call to process a call request or perform other functions relating to a call.

In an embodiment, the next step of the process comprises determining the performance metric based on each bin 660.

In an embodiment where the performance metric comprises a percentile value, wherein a total value comprises the sum of the count of every bin, and determining the call performance metric comprises: setting a temporary count to zero; adding the count of the bin with the smallest minimum size to the temporary count until the temporary count divided by the total value is greater than or equal to the percentile value; and returning the range of the bin that corresponds to the last count added to the temporary value.

In an embodiment where the performance metric comprises the minimum meta-data received and determining the call performance metric comprises determining the range of the bin with the smallest minimum value that has an incremented count.

In an embodiment where the performance metric comprises the maximum meta-data received and determining the call performance metric comprises determining the range of the bin with the largest maximum value that has an incremented count.

In an embodiment, the next step of the process comprises returning the determined performance metric 670. In an embodiment, this performance metric may be returned as a representation of a histogram or a distribution. Where a single value is requested, the range of the appropriate bin may be returned. For instance, where the minimum call latency is requested, and the minimum call latency is associated with a bin of range 5-9 ms, 5-9 ms may be returned. In an embodiment, a histogram is provided to the network management entity that then processes and generates the distribution information. In another embodiment, the system recording the events may calculate the required distribution (e.g. $50^{th}$ percentile or $95^{th}$ percentile of the measurement), and report that result to the network management entity.

The methods and systems discussed may be implemented, in whole or in part, on a computer readable storage medium, comprising a plurality of files, each file with a physical location on said computer readable storage medium. The computer readable medium may be an optical disk which may be for example in the form of a Digital Versatile Disc ("digital video disc," "DVD"). The invention is not limited to this type of computer readable medium, however. Other exemplary forms of computer readable media are RAM, ROM, EEPROM, flash memory or other memory technology, CD-ROM, or other optical disk storage, magnetic cassettes, magnetic tape, magnetic disk storage or other magnetic storage devices, or any other medium which can be used to store the desired information and which can accessed by a computer.

What is claimed is:

1. A method for real-time monitoring of the status of a communications system performed on a mobile device comprising a processor and a memory coupled to the processor, the method comprising:
   providing at least one bin stored in the memory, wherein each bin has a size which corresponds to a range comprising a minimum value;
   receiving an indication of at least one call, wherein the indication comprises call performance meta-data;
   determining on the processor which bin stored in the memory corresponds to the meta-data;
   incrementing a count in the bin stored in the memory that corresponds to the meta-data;
   receiving a request to determine a performance metric;
   determining on the processor the performance metric based on each bin; and
   returning the determined performance metric.

2. The method of claim 1, wherein the performance metric comprises a percentile value, wherein a total value comprises the sum of the count of every bin, and wherein determining the performance metric comprises:
   setting a temporary count to zero;
   adding the count of the bin with the smallest minimum value to the temporary count until the temporary count divided by the total value is greater than or equal to the percentile value; and
   returning the range of the bin that corresponds to the last count added to the temporary value.

3. The method of claim 1, wherein the performance metric comprises the minimum meta-data received and determining the call performance metric comprises:
   determining the range of the bin with the smallest minimum value that has an incremented count.

4. The method of claim 1, wherein the performance metric comprises the maximum meta-data received and determining the call performance metric comprises:
   determining the range of the bin with the largest maximum value that has an incremented count.

5. The method of claim 1, wherein each range comprises a minimum value and a maximum value.

6. The method of claim 5, wherein the bin with the smallest minimum value comprises a larger size than at least one other bin.

7. The method of claim 5, wherein the bin with the largest maximum value comprises a larger size than at least one other bin.

8. The method of claim 5, further comprising:
   modifying the range of a first bin by replacing the first bin's maximum size with a second bin's maximum size, wherein the second bin's maximum value is greater than the first bin's maximum value, and no values exist between the first bin's maximum value and the second bin's minimum value; and
   incrementing the count of the first bin by the count of the second bin.

9. The method of claim 8, wherein modifying the range is performed upon receiving meta-data outside of the range of any bin, the method further comprising:
   decrementing the second bin's count to zero;
   modifying the second bin's range such that the difference between the second bin's maximum value and the second bin's minimum value equals the size, such that the range of the second bin does not overlap with the range of any other bin, and such that the meta-data is greater than or equal to the second bin's modified minimum value and less than or equal to the second bin's modified maximum value; and
   incrementing the second bin's count.

10. The method of claim 1, wherein a size corresponds to a period of time.

11. The method of claim 1, wherein the performance metric is at least one from a set, the set comprising system load and system performance.

12. The method of claim 11, wherein system load is at least one from a subset, the subset comprising a percentile value, average load, minimum load, maximum load, busy hour call attempt, and Erlang.

13. The method of claim 11, wherein the system performance is at least one from a subset, the subset comprising latency, call setup latency, call success rate, standard deviation, and processing time.

14. The method of claim 1, wherein the performance metric is represented as one from a set, the set comprising:
   a histogram, and a distribution.

15. The method of claim 1, wherein at least one bin has a different size than the size of at least one other bin.

16. The method of claim 1, wherein no bin's range overlaps with any other bin's range.

17. The method of claim 1, wherein the bins comprise a fixed data structure.

18. The method of claim 17, wherein the fixed data structure is at least one from a set, the set comprising a vector and an array.

19. The method of claim 1, wherein the bins comprise a dynamic data structure.

20. The method of claim 19, wherein the dynamic data structure is at least one from a set, the set comprising a hash, a tree, and a map.

21. The method of claim 1, wherein the smallest bin minimum value is zero, wherein all values between zero and the largest bin maximum value correspond to a bin, wherein each bin has the same size, and wherein determining the bin that corresponds to the meta-data comprises:
dividing the meta-data by the size to produce a bin number; and
determining that the bin that corresponds to the meta-data is an identified bin, such that there are bin number minus one of bins that have a minimum value less than that of the identified bin.

22. The method of claim 1, further comprising:
allocating storage resources for the bin that corresponds to the meta-data when incrementing the count in the bin the first time.

23. A non-transitory computer-readable medium having stored thereon processor-executable instructions configured to cause a processor to perform operations to monitor in real-time the status of a communications system, the operations comprising:
selecting a size for at least one bin, wherein a size corresponds to a range comprising a minimum value;
receiving an indication of at least one call, wherein the indication comprises call performance meta-data;
determining the bin that corresponds to the meta-data;
incrementing a count in the bin that corresponds to the meta-data;
receiving a request to determine a performance metric;
determining the performance metric based on each bin; and
returning the determined performance metric.

24. The non-transitory computer-readable medium of claim 23, wherein the performance metric comprises a percentile value, wherein a total value comprises the sum of the count of every bin, and wherein the stored processor-executable instructions are configured to cause a processor to perform operations further comprising:
setting a temporary count to zero;
adding the count of the bin with the smallest minimum size to the temporary count until the temporary count divided by the total value is greater than or equal to the percentile value; and
returning the range of the bin that corresponds to the last count added to the temporary value.

25. The non-transitory computer-readable medium of claim 23, wherein the performance metric comprises the minimum meta-data received and wherein the stored processor-executable instructions are configured to cause a processor to perform operations further comprising:
determining the range of the bin with the smallest minimum value that has an incremented count.

26. The non-transitory computer-readable medium of claim 23, wherein the performance metric comprises the maximum meta-data received and wherein the stored processor-executable instructions are configured to cause a processor to perform operations further comprising:
determining the range of the bin with the largest maximum value that has an incremented count.

27. The non-transitory computer-readable medium of claim 23, wherein the stored processor-executable instructions are configured to cause a processor to perform operations such that each range comprises a minimum value and a maximum value.

28. The non-transitory computer-readable medium of claim 27, wherein the stored processor-executable instructions are configured to cause a processor to perform operations such that the bin with the smallest minimum value comprises a larger size than at least one other bin.

29. The non-transitory computer-readable medium of claim 27, wherein the stored processor-executable instructions are configured to cause a processor to perform operations such that the bin with the largest maximum value comprises a larger size than at least one other bin.

30. The non-transitory computer-readable medium of claim 27, wherein the stored processor-executable instructions are configured to cause a processor to perform operations further comprising:
modifying the range of a first bin by replacing the first bin's maximum size with a second bin's maximum size, wherein the second bin's maximum value is greater than the first bin's maximum value, and no values exist between the first bin's maximum value and the second bin's minimum value; and
incrementing the count of the first bin by the count of the second bin.

31. The non-transitory computer-readable medium of claim 30, wherein the stored processor-executable instructions are configured to cause a processor to perform operations such that modifying the range is performed upon receiving meta-data outside of the range of any bin, and wherein the stored processor-executable instructions are configured to cause a processor to perform operations further comprising:
decrementing the second bin's count to zero;
modifying the second bin's range such that the difference between the second bin's maximum value and the second bin's minimum value equals the size, such that the range of the second bin does not overlap with the range of any other bin, and such that the meta-data is greater than or equal to the second bin's modified minimum value and less than or equal to the second bin's modified maximum value; and
incrementing the second bin's count.

32. The non-transitory computer-readable medium of claim 23, wherein the stored processor-executable instructions are configured to cause a processor to perform operations such that a size corresponds to a period of time.

33. The non-transitory computer-readable medium of claim 23, wherein the stored processor-executable instructions are configured to cause a processor to perform operations such that the performance metric is at least one from a set, the set comprising system load and system performance.

34. The non-transitory computer-readable medium of claim 33, wherein the stored processor-executable instructions are configured to cause a processor to perform operations such that system load is at least one from a subset, the subset comprising a percentile value, average load, minimum load, maximum load, busy hour call attempt, and Erlang.

35. The non-transitory computer-readable medium of claim 33, wherein the stored processor-executable instructions are configured to cause a processor to perform operations such that the system performance is at least one from a subset, the subset comprising latency, call setup latency, call success rate, standard deviation, and processing time.

36. The non-transitory computer-readable medium of claim 23, wherein the stored processor-executable instructions are configured to cause a processor to perform operations such that the performance metric is represented as one from a set, the set comprising:
a histogram, and a distribution.

37. The non-transitory computer-readable medium of claim 23, wherein the stored processor-executable instructions are configured to cause a processor to perform operations such that at least one bin has a different size than the size of at least one other bin.

38. The non-transitory computer-readable medium of claim 23, wherein the stored processor-executable instructions are configured to cause a processor to perform operations such that no bin's range overlaps with any other bin's range.

39. The non-transitory computer-readable medium of claim 23, wherein the stored processor-executable instructions are configured to cause a processor to perform operations such that the bins comprise a fixed data structure.

40. The non-transitory computer-readable medium of claim 39, wherein the stored processor-executable instructions are configured to cause a processor to perform operations such that the fixed data structure is at least one from a set, the set comprising a vector and an array.

41. The non-transitory computer-readable medium of claim 23, wherein the stored processor-executable instructions are configured to cause a processor to perform operations such that the bins comprise a dynamic data structure.

42. The non-transitory computer-readable medium of claim 41, wherein the stored processor-executable instructions are configured to cause a processor to perform operations such that the dynamic data structure is at least one from a set, the set comprising a hash, a tree, and a map.

43. The non-transitory computer-readable medium of claim 23, wherein the stored processor-executable instructions are configured to cause a processor to perform operations such that the smallest bin minimum value is zero, wherein all values between zero and the largest bin maximum value correspond to a bin, wherein each bin has the same size, and wherein the computer-readable medium has stored thereon instructions to cause the processor to perform operations further comprising:
dividing the meta-data by the size to produce a bin number; and
determining that the bin that corresponds to the meta-data is an identified bin, such that there are bin number minus one of bins that have a minimum value less than that of the identified bin.

44. The non-transitory computer-readable medium of claim 23, wherein the stored processor-executable instructions are configured to cause a processor to perform operations further comprising:
allocating storage resources for the bin that corresponds to the meta-data when incrementing the count in the bin the first time.

45. A system for monitoring of the status of a communications system comprising:
a processor;
at least one bin stored in a memory, wherein each bin has a size which corresponds to a range comprising a minimum value;
means for receiving an indication of at least one call, wherein the indication comprises call performance meta-data;
means for determining which bin corresponds to the meta-data;
means for incrementing a count in the bin that corresponds to the meta-data;
means for receiving a request to determine a performance metric;
means for determining the performance metric based on the bins in the memory; and
means for returning the determined performance metric.

46. The system of claim 45, wherein the performance metric comprises a percentile value, wherein a total value comprises the sum of the count of every bin, and the means for determining the performance metric comprises:
means for setting a temporary count to zero;
means for adding the count of the bin with the smallest minimum value to the temporary count until the temporary count divided by the total value is greater than or equal to the percentile value; and
means for returning the range of the bin that corresponds to the last count added to the temporary value.

47. The system of claim 45, wherein the performance metric comprises the minimum meta-data received and the means for determining the call performance metric comprises:
means for determining the range of the bin with the smallest minimum value that has an incremented count.

48. The system of claim 45, wherein the performance metric comprises the maximum meta-data received and the means for determining the call performance metric comprises:
means for determining the range of the bin with the largest maximum value that has an incremented count.

49. The system of claim 45, wherein each range comprises a minimum value and a maximum value.

50. The system of claim 49, wherein the bin with the smallest minimum value comprises a larger size than at least one other bin.

51. The system of claim 49, wherein the bin with the largest maximum value comprises a larger size than at least one other bin.

52. The system of claim 49, further comprising:
means for modifying the range of a first bin by replacing the first bin's maximum size with a second bin's maximum size, wherein the second bin's maximum value is greater than the first bin's maximum value, and no values exist between the first bin's maximum value and the second bin's minimum value; and
means for incrementing the count of the first bin by the count of the second bin.

53. The system of claim 52, wherein means for modifying the range comprises means for modifying the range upon receiving meta-data outside of the range of any bin, the system further comprising:
means for decrementing the second bin's count to zero;
means for modifying the second bin's range such that the difference between the second bin's maximum value and the second bin's minimum value equals the size, such that the range of the second bin does not overlap with the range of any other bin, and such that the meta-data is greater than or equal to the second bin's modified minimum value and less than or equal to the second bin's modified maximum value; and
means for incrementing the second bin's count.

54. The system of claim 45, wherein a size corresponds to a period of time.

55. The system of claim 45, wherein the performance metric is at least one from a set, the set comprising system load and system performance.

56. The system of claim 55, wherein system load is at least one from a subset, the subset comprising a percentile value, average load, minimum load, maximum load, busy hour call attempt, and Erlang.

57. The system of claim 55, wherein the system performance is at least one from a subset, the subset comprising latency, call setup latency, call success rate, standard deviation, and processing time.

58. The system of claim 45, wherein the performance metric is represented as one from a set, the set comprising:
a histogram, and a distribution.

59. The system of claim 45, wherein at least one bin has a different size than the size of at least one other bin.

60. The system of claim 45, wherein no bin's range overlaps with any other bin's range.

61. The system of claim 45, wherein the bins comprise a fixed data structure.

62. The system of claim 61, wherein the fixed data structure is at least one from a set, the set comprising a vector and an array.

63. The system of claim 45, wherein the bins comprise a dynamic data structure.

64. The system of claim 63, wherein the dynamic data structure is at least one from a set, the set comprising a hash, a tree, and a map.

65. The system of claim 45, wherein the smallest bin minimum value is zero, wherein all values between zero and the largest bin maximum value correspond to a bin, wherein each bin has the same size, and wherein the means for determining the bin that corresponds to the meta-data comprises:
means for dividing the meta-data by the size to produce a bin number; and
means for determining that the bin that corresponds to the meta-data is an identified bin, such that there are bin number minus one of bins that have a minimum value less than that of the identified bin.

66. The system of claim 45, further comprising:
means for allocating storage resources for the bin that corresponds to the meta-data when incrementing the count in the bin the first time.

* * * * *